2,822,403
PROCESS FOR THE PREPARATION OF β-PHENYL ETHYL ALCOHOL

Heinrich Hopff and Hansheinrich Kuhn, Zurich, Switzerland, and Ulrich Hoffmann, Bad Homburg, Germany, assignors to Pittsburgh Coke & Chemical Company, Pittsburgh, Pa., a corporation of Pennsylvania No Drawing. Application December 7, 1954
Serial No. 473,732

11 Claims. (Cl. 260—618)

The present invention is directed to an improved process of preparing β-phenyl ethyl alcohol.

It has previously been suggested to prepare β-phenyl ethyl alcohol by catalytic hydrogenation of styrene oxide. The styrene oxide in such process is hydrogenated in pure form with hydrogen in the presence of a catalyst. It has also been proposed to carry out this hydrogenation in the presence of an alcohol, for example, methanol, as a solvent. Neither of these processes has found commercial success, since side reactions occur and undesirable by-products are formed.

It is an object of the present invention to prepare β-phenyl ethyl alcohol from styrene oxide in increased yields.

An additional object of the invention is to reduce the formation of undesirable by-products to a minimum in the preparation of β-phenyl ethyl alcohol from styrene oxide.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The foregoing objects are accomplished by virtue of the unexpected discovery that substantially quantitative yields of β-phenyl ethyl alcohol can be obtained if the catalytic hydrogenation is carried out in the presence of water. It is particularly advantageous for the reaction to be carried out with stirring to aid in the intimate admixture of the styrene oxide with water.

While the ratio of styrene oxide to water is not especially critical, it has been found desirable to use from 20 to 100 parts by weight of styrene oxide with 100 parts by weight of water.

The reaction is normally carried out using an excess of hydrogen. It is advantageous to carry out the hydrogenation at superatmospheric pressure, the preferred initial hydrogen pressure range being from 20 to 200 atmospheres.

While the reaction temperature is not especially critical, it is generally within the range of 20° C. to 100° C.

In order to facilitate the hydrogenation of the styrene oxide with hydrogen and to reduce side reactions to an absolute minimum, it has been found desirable to add to the reaction mixture small quantities of alkaline reacting substances, e. g., sodium hydroxide, sodium carbonate, potassium hydroxide, potassium carbonate, calcium hydroxide, calcium oxide, barium oxide, and barium hydroxide. The particular alkaline material employed is not especially critical, but the pH of the reaction mixture should preferably be between a pH of 7 and a pH of 8.

The yield of β-phenyl ethyl alcohol is affected by the degree of dispersion of the styrene oxide in water. Therefore, it is desirable to stir the mixture vigorously and it is further advantageous to add small quantities of emulsifying substances, e. g., 0.1% to 5% by weight of the styrene oxide.

In general, low temperature hydrogenation catalysts can be employed. Finely divided nickel, cobalt, platinum and palladium have all been found to be suitable hydrogenation catalysts. Active carbon also is a good catalyst. Metals having a catalytic action, such as those mentioned above, may be deposited on inactive carrier substances, e. g., silicon dioxide, aluminum oxide or kieselguhr, in known manner, and employed in that form as the catalyst. The catalyst is generally employed in an amount of 1% to 5% by weight of the styrene oxide.

In accordance with the present invention, the hydrogenation takes place in a short time and with almost quantitative yield, without the formation of undesired by-products.

Example I 100 parts of styrene oxide are stirred in a pressure resistant vessel with 500 parts of water, 2 parts of sodium carbonate and 3 parts of Raney nickel at an initial hydrogen pressure of 50 atmospheres at about 50° C. until the pressure is constant. After about 30 mintues, the hydrogen absorption has terminated. The β-phenyl ethyl alcohol is obtained in almost quantitative yield by distillation after first removing the water.

Example II 100 parts of styrene oxide are stirred in a pressure resistant vessel with 100 parts of water, 2 parts of barium hydroxide as an alkaline catalyst, 3 parts of Raney cobalt as a hydrogenation catalyst and 2 parts of dioctyl-sulfosuccinate as an emulsifying agent at an initial hydrogen pressure of 20 atmospheres at about 70° C. until the pressure is constant. After about 120 minutes, the hydrogen absorption has terminated. The water is removed by distillation and then the β-phenyl ethyl alcohol is obtained in 99% yield by distillation.

The emulsifying agent recited in Example II is merely exemplary. In place of this particular emulsifying agent, there can be employed any emulsifying agent which is stable in an alkaline medium.

The dispersing agents, of course, should be stable in the reaction mixture. Among the anionic dispersing agents which can be used are sodium dioctyl sulfosuccinate (Aerosol OT), sodium dihexyl sulfosuccinate (Aerosol MA), Turkey red oil, sodium sulfoethyl oleate (Igepon A), sodium salt of oleyl-N-methyl taurine (Igepon T), sodium tetradecane sulfonate, sodium diisopropyl naphthalene sulfonate (Nekal A), sodium dibutyl naphthalene sulfonate (Nekal BV), sodium alkyl benzene sulfonate having an alkyl group with an average chain length of 10, 14 or 18 carbon atoms, sodium phenyl hexane sulfonate, alkyl naphthalene sulfonate-formaldehyde condensation products, sodium monobutylphenyl phenol sulfonate, sodium lauryl sulfate (10 to 14 carbon atom alkyl group with average of about 12), and sodium cetyl sulfate and similar salt of paraffin sulfonic acids, fatty alcohol sulfonates, alkylated naphthalene sulfonates, the addition products of sulfuric acid with olefins, etc.

Nonionic dispersing agents can also be used, such as alkylphenolethylene oxides, e. g., p-isooctyl phenol-10-ethylene oxide; long chain alcohol-ethylene oxide condensation products, e. g., dodecyl alcohol ethylene oxide having 4 to 16 ethylene oxide groups, polyglycerol monolaurate, diglycol oleate, sorbitan monolaurate or monostearate or monopalmitate or monooleate (Spans), the reaction product of any of the above sorbitan esters with ethylene oxide (Tweens).

Cationic dispersing agents can also be used. Examples of cationic dispersing agents are cetyl trimethyl ammonium chloride, cetyl pyridinium chloride, dodecyl dimethyl benzyl ammonium chloride (Triton K) and similar quarternary ammonium halides.

Unless otherwise specified, all parts are by weight.

We claim:

1. A process for the preparation of β-phenyl ethyl alcohol comprising catalytically hydrogenating styrene oxide at a temperature between about 20 and 100° C., and at an initial hydrogen pressure between about 20 and about 200 atmospheers while the styrene oxide is dispersed in water with vigorous agitation.

2. The process of claim 1, wherein the reaction is carried out in the presence of a small amount of an alkaline reacting substance.

3. The process of claim 1, wherein the reaction is carried out in the presence of an emulsifying agent.

4. The process of claim 1, wherein the hydrogenation catalyst is nickel.

5. The process of claim 1, wherein the hydrogenation catalyst is active carbon.

6. The process of claim 1, wherein the reaction is carried out in the presence of a small amount of sodium carbonate.

7. The process of claim 1, wherein the reaction is carried out in the presence of a small amount of sodium hydroxide.

8. The process of claim 1, wherein the hydrogenation catalyst is cobalt.

9. The process of claim 1, wherein the hydrogenation catalyst is platinum.

10. The process of claim 1, wherein the hydrogenation catalyst is palladium.

11. A process according to claim 1 wherein there are employed about 20–100 parts by weight of styrene oxide for each 100 parts by weight of water.

References Cited in the file of this patent

UNITED STATES PATENTS

| 2,524,096 | Bush | Oct. 3, 1950 |

FOREIGN PATENTS

| 545,583 | Germany | Feb. 18, 1932 |
| 678,589 | Great Britain | Sept. 3, 1952 |

OTHER REFERENCES

Newman et al.: Jour. Amer. Chem. Soc., vol. 71, pp. 3362–63 (October 1949), 2 pages.